US010503296B2

(12) United States Patent
Guo et al.

(10) Patent No.: US 10,503,296 B2
(45) Date of Patent: Dec. 10, 2019

(54) TOUCH DISPLAY PANEL AND DISPLAY DEVICE

(71) Applicant: Shanghai Tianma Micro-Electronics Co., Ltd., Shanghai (CN)

(72) Inventors: Hao Guo, Shanghai (CN); Jine Liu, Shanghai (CN); Xiangjian Kong, Shanghai (CN); Min Zhang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 156 days.

(21) Appl. No.: 15/702,792

(22) Filed: Sep. 13, 2017

(65) Prior Publication Data

US 2018/0341354 A1    Nov. 29, 2018

(30) Foreign Application Priority Data

May 24, 2017   (CN) .......................... 2017 1 0372967

(51) Int. Cl.
*G06F 3/041*    (2006.01)
*G06F 3/044*    (2006.01)
(Continued)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC ........... G02F 1/13338; G02F 1/133512; G02F 1/134309; G02F 1/136286;
(Continued)

(56) References Cited

U.S. PATENT DOCUMENTS 10,031,629  B2 *  7/2018  Wu .................. G06F 3/044
2016/0224155  A1 *  8/2016  Kim ................. G06F 3/044
(Continued)

FOREIGN PATENT DOCUMENTS

CN      104020891 A    9/2014
CN      104536637 A    4/2015
CN      105022523 A    11/2015

OTHER PUBLICATIONS

Chinese Office Action dated Sep. 4, 2019 for corresponding CN Application No. 201710372967.6 and English translation.

*Primary Examiner* — Afroza Chowdhury
(74) *Attorney, Agent, or Firm* — Tarolli, Sundheim, Covell & Tummino LLP

(57) ABSTRACT

A touch display panel includes: a base substrate provided with multiple gate lines and data lines which are insulated from and intersecting with each other to define multiple sub-pixels; a common electrode layer, formed by multiple self-capacitance electrodes arranged in an M*N array; a drive integrated circuit; and multiple touch detection signal lines; at least three adjacent columns of sub-pixels constitute a pixel column, each column of sub-pixels is parallel to an extending direction of the data line; the touch detection signal line is located between two adjacent columns of sub-pixels, the multiple touch detection signal lines connects the self-capacitance electrode with the drive integrated circuit, at least part of two adjacent pixel columns is not provided with the touch detection signal line therebetween; the drive integrated circuit provides common signal or touch detection signal to the touch detection signal line in display stage or touch stage, respectively.

13 Claims, 8 Drawing Sheets

(51) Int. Cl.
*G02F 1/1333* (2006.01)
*G02F 1/1362* (2006.01)
*G02F 1/1343* (2006.01)
*G02F 1/1335* (2006.01)

(52) U.S. Cl.
CPC .. *G02F 1/134309* (2013.01); *G02F 1/136286* (2013.01); *G06F 3/044* (2013.01); *G06F 3/0416* (2013.01); *G02F 2201/121* (2013.01); *G02F 2201/123* (2013.01); *G06F 2203/04107* (2013.01)

(58) Field of Classification Search
CPC ......... G02F 2201/121; G02F 2201/123; G06F 2203/04107; G06F 3/0412; G06F 3/0416; G06F 3/044
See application file for complete search history.

(56) References Cited

U.S. PATENT DOCUMENTS

2017/0185191 A1* 6/2017 Kim ...................... G06F 3/0412
2017/0192573 A1* 7/2017 Kim ...................... G06F 3/0412
2017/0344145 A1* 11/2017 Lo .......................... G06F 3/044

* cited by examiner

TOUCH DISPLAY PANEL AND DISPLAY DEVICE

CROSS-REFERENCE TO RELATED APPLICATIONS

The present application claims priority to Chinese Patent Application No. 201710372967.6, filed on May 24, 2017, the content of which is incorporated herein by reference in its entirety.

TECHNICAL FIELD

The present disclosure relates to the field of touch display technologies and, particularly, relates to a touch display panel, and a display device including the touch display panel.

BACKGROUND

With rapid development of display techniques, touch screen panel has been popularized in people's life. At present, the touch screen panel can be divided, according to the configuration, into add on mode touch panel, on cell touch panel, and in cell touch panel. For the add on mode touch panel, a touch screen panel and a liquid crystal display (Liquid Crystal Display, LCD) panel are produced separately, and are then adhered together to form a liquid crystal display panel having touch function. As a result, the add on mode touch panel has the defects of high production cost, low transmittance, large module thickness and the like. For the in cell touch panel, a touch electrode of the touch screen panel is embedded into the interior of the liquid crystal display panel, which can reduce the thickness of the entire module, and can significantly reduce production cost of the touch screen panel. Therefore, the in cell touch panel is favored by most panel manufacturers.

At present, the in cell touch panel in the related art is based on the principle of mutual capacitance or self-capacitance to achieve detection of a touch position of finger. According to the principle of self-capacitance, multiple self-capacitance electrodes can be arranged in a same layer and mutually insulated in the touch screen panel, when a human body does not touch the screen yet, the capacitance of each self-capacitance electrode is a fixed value, when a human body touches the screen, the capacitance of the corresponding self-capacitance electrode is a sum of a fixed value and a body capacitance, a touch detection chip can judge out the touch position during the touching period through detecting the capacitance value change of each self-capacitance electrode. Since the body capacitance can effect on the total self-capacitance of the self-capacitance electrode, but can only effect on the projective capacitance of the mutual capacitance electrode, since the capacitance value change caused by body touch on the screen of the panel adopting self-capacitance electrode is larger than that of the panel adopting mutual capacitance electrode, therefore, the signal to noise ratio of a touch on a touch panel adopting self-capacitance electrode can be effectively increased, so as to improve the accuracy of touch sensing.

SUMMARY

The embodiment of the present disclosure provides a touch display panel and a display device including the touch display panel.

A first aspect of the present disclosure provides a touch display panel, including: a base substrate, a plurality of gate lines provided on the base substrate, a plurality of data lines provided on the base substrate, a common electrode layer formed by a plurality of self-capacitance electrodes arranged in an M*N array; a drive integrated circuit; and a plurality of touch detection signal lines; wherein the plurality of gate lines and the plurality of data lines are insulated from and intersecting with each other to define a, plurality of sub-pixels, at least three adjacent sub-pixel columns of the plurality of sub-pixels constitute one pixel column, each sub-pixel column is parallel to an extending direction of the plurality of data lines; each of the plurality of touch detection signal lines is located between two adjacent pixel columns, the plurality of touch detection signal lines connects the plurality of self-capacitance electrodes with the drive integrated circuit, at least a part of the two adjacent pixel columns is not provided with the touch detection signal line therebetween; in a display stage, the drive integrated circuit provides a common signal to the plurality of touch detection signal lines; in a touch stage, the drive integrated circuit provides a touch detection signal to the plurality of touch detection signal lines.

A second aspect of the present disclosure provides a display device, including a touch display panel, the touch display panel includes: a base substrate, a plurality of gate lines provided on the base substrate, a plurality of data lines provided on the base substrate, a common electrode layer formed by a plurality of self-capacitance electrodes arranged in an M*N array; a drive integrated circuit; and a plurality of touch detection signal lines; wherein the plurality of gate lines and the plurality of data lines are insulated from and intersecting with each other to define a plurality of sub-pixels, at least three adjacent sub-pixel columns of the plurality of sub-pixels constitute one pixel column, each sub-pixel column is parallel to an extending direction of the plurality of data lines; each of the plurality of touch detection signal lines is located between two adjacent pixel columns, the plurality of touch detection signal lines connects the plurality of self-capacitance electrodes with the drive integrated circuit, at least a part of the two adjacent pixel columns is not provided with the touch detection signal line therebetween; in a display stage, the drive integrated circuit provides a common signal to the plurality of touch detection signal lines; in a touch stage, the drive integrated circuit provides a touch detection signal to the plurality of touch detection signal lines.

The touch display panel and the display device provided by the present disclosure include a base substrate, a plurality of gate lines and a plurality of data lines, a common electrode, a drive integrated circuit and a plurality of touch detection signal lines. The plurality of gate lines and the plurality of data lines are arranged on the base substrate, and are insulated from and intersecting with each other to define a plurality of sub-pixels. At least three adjacent columns of sub-pixels form a pixel column, each column of sub-pixels is parallel to an extending direction of the data line. The common electrode layer is formed by self-capacitance electrodes arranged in an M*N array. The touch detection signal line is located between two adjacent columns of sub-pixels, the plurality of touch detection signal lines connect the self-capacitance electrode with the drive integrated circuit, and the touch detection signal circuit is not provided between two partially adjacent pixel columns. In the display stage, the drive integrated circuit provides a common signal to the touch detection signal line, and the self-capacitance electrode is also used as the common electrode; in the touch stage, the drive integrated circuit provides a touch detection signal to the touch detection signal line. In the touch display panel and the display device provided by the present disclosure, a touch detection signal line is not provided between two partially adjacent pixel columns, which improves open ratio of the pixel, thereby improving display effect.

BRIEF DESCRIPTION OF DRAWINGS

Other features, objects and advantages of the present disclosure will be more apparent with reference to the detailed description of non-restrictive embodiments shown in the accompanying drawings as follows.

DESCRIPTION OF EMBODIMENTS

The principles and features of the present disclosure will be further illustrated in detail with reference to the accompanying drawings and embodiments. It should be understood that, the embodiments described herein are merely used to illustrate the present disclosure, rather than limit the present disclosure. It should be noted that, for ease of description, the accompanying drawings only show the parts relevant to the present disclosure.

It should be noted that, the embodiments in the present disclosure and the characters in the embodiments can be combined with each other, unless conflict occurs. The present disclosure will be described in detail with reference to the accompanying drawings and embodiments.

Figure 1A:
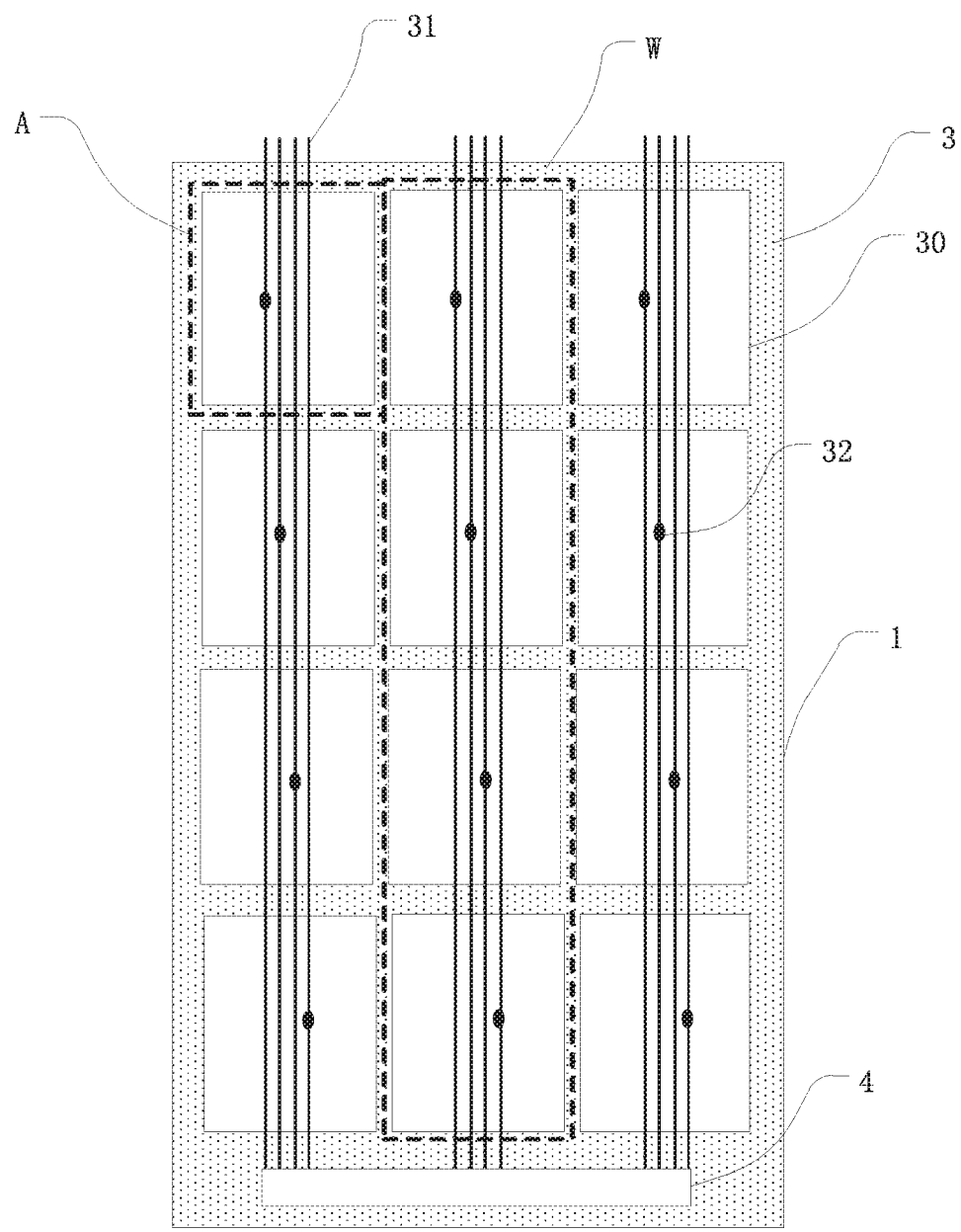
FIG. 1A illustrates a top view of a touch display panel according to an embodiment of the present disclosure.
Figure 1B:
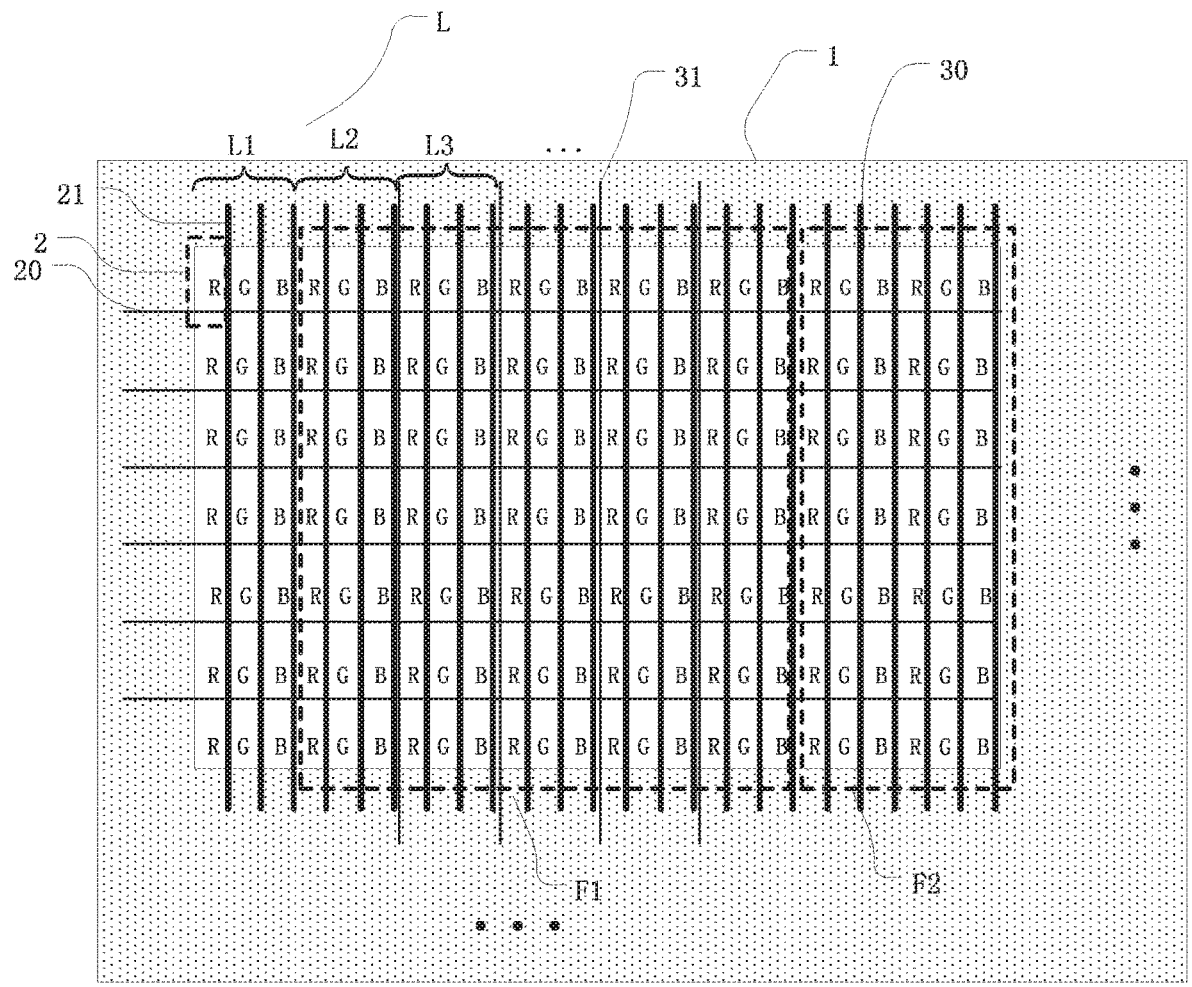
FIG. 1B illustrates an enlarged view of part A of the touch display panel shown in FIG. 1A.

Please refer to FIG. 1A and FIG. 1B, FIG. 1A illustrates a top view of a touch display panel according to an embodiment of the present disclosure, FIG. 1B illustrates an enlarged view of part A of the touch display panel shown in FIG. 1A. The touch display panel includes a base substrate 1, the base substrate 1 is provided with a plurality of gate lines 20 and a plurality of data lines 21, the plurality of gate lines 20 and the plurality of data lines 21 are insulated from and intersecting with each other so as to define a plurality of sub-pixels 2. At least three adjacent columns of sub-pixels 2 constitute a pixel column L, each column of sub-pixels 2 is parallel to an extending direction of the data line 21. When the sub-pixel 2 is one of red, green and blue (RGB) pixels, three adjacent columns of sub-pixels 2 constitute a pixel column L. The present disclosure does not limit the arrangement of the sub-pixel 2. In the pixel column L, the first row may be RGB, the second row may be RGB or GBR. When the sub-pixel 2 is one of red, green, blue and white (RGBW) pixels, four adjacent columns of sub-pixels 2 constitute a pixel column L. In FIG. 1B, the sub-pixel 2 being one of RGB pixels is taken as an example. The touch display panel further includes a drive integrated circuit 4, a common electrode layer 3, a plurality of touch detection signal lines 31. The common electrode layer 3 is formed by self-capacitance electrodes 30 arranged in an M*N array. The M*N array refers to an arrangement with M rows and N columns, both M and N are positive integers greater than 2. As shown in FIG. 1A, the common electrode layer 3 is formed by self-capacitance electrodes 30 arranged in a 4*3 array. The touch detection signal line 31 is located between two adjacent pixel columns L, and the touch detection signal line 31 is not provided between two partially adjacent pixel columns L, for example, as shown in FIG. 1B, the touch detection signal line 31 is not provided between the pixel column L1 and the pixel column L2, and the touch detection signal line 31 is provided between the pixel column L2 and the pixel column L3. The plurality of touch detection signal lines 31 connects the self-capacitance electrode 30 with the drive integrated circuit 4 by extending through a through-hole 32. In display stage, the drive integrated circuit 4 provides a common signal to the touch detection signal line 31, the self-capacitance electrode 30 is also used as a common electrode, so as to achieve display. In touch stage, the drive integrated circuit 4 provides a touch detection signal to the touch detection signal line 31, so as to achieve touch control. Since the touch detection signal line is a non-transparent metal line, therefore, comparing with the related art, in the touch display panel provided by the present disclosure, a touch detection signal line is not provided between two partially adjacent pixel columns, which improves open ratio of the touch display panel, thereby improving display effect.

Figure 2:
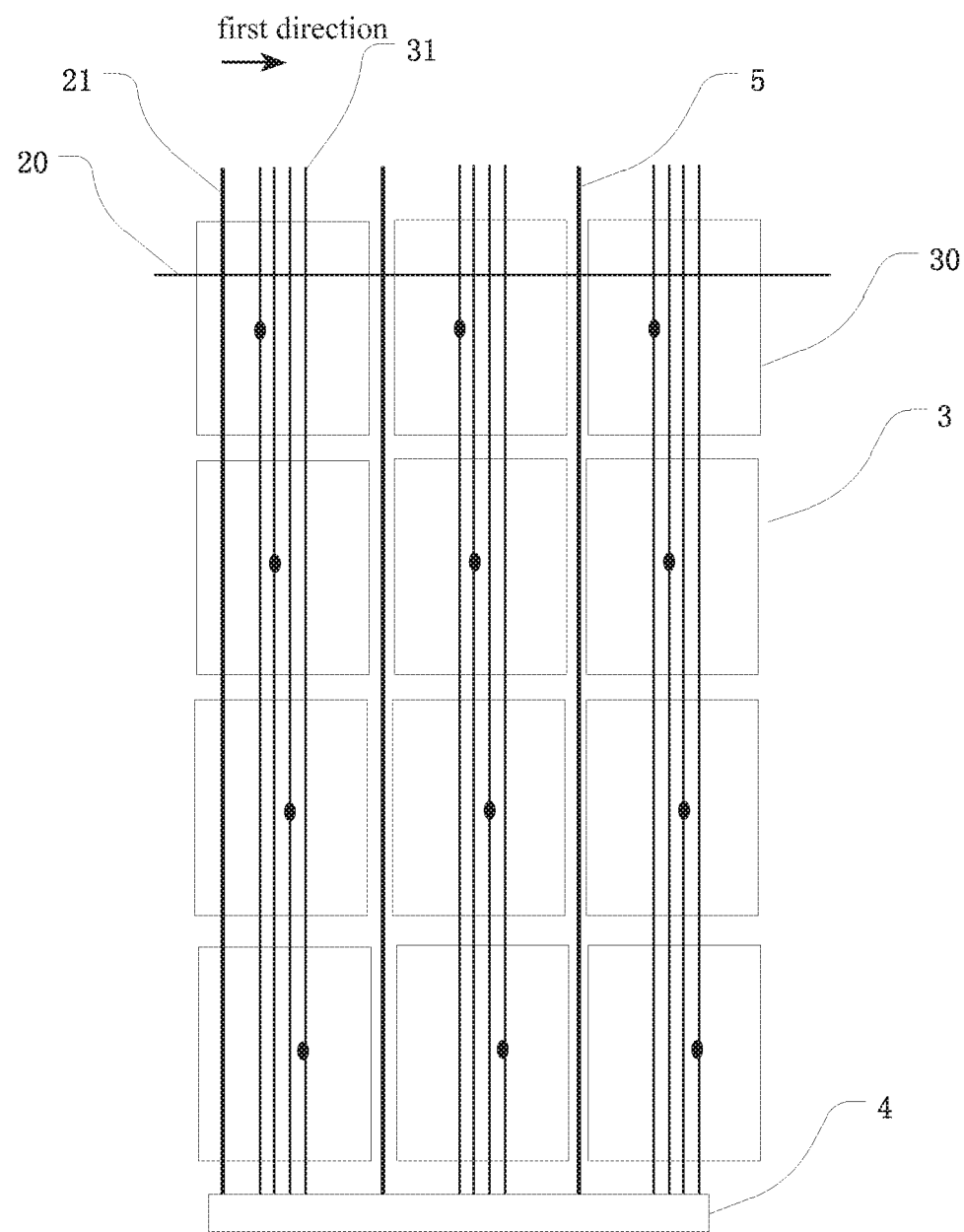
FIG. 2 illustrates a top view of a touch display panel according to another embodiment of the present disclosure.

As shown in FIG. 2, another touch display panel provided by the present disclosure further includes a plurality of metal lines 5. The plurality of metal lines 5 is arranged in a gap between adjacent self-capacitance electrodes 30 along an extending direction of a scan line 20, i.e., the first direction. The metal line 5 and the touch detection signal line 31 are arranged in a same layer and are parallel to each other. In the display stage, the drive integrated circuit 4 provides a common signal to the metal line 5. In the touch stage, the drive integrated circuit 4 provides a touch detection signal to the metal line 5. The metal line provided by the present disclosure can achieve the effect of shielding the electric field generated by the data lines in the gap of the self-capacitance electrode, which solves the problem of light leakage and poor frame display effect caused by voltage fluctuation of the data line, thereby improving display effect.

An embodiment of the present disclosure provides another touch display panel, in each column of self-capacitance electrodes, each self-capacitance electrode is corresponding to one of M touch detection signal lines one by one. Referring to FIG. 1A, the common electrode layer 3 is formed by self-capacitance electrodes 30 arranged in a 4*3 array. In each column of self-capacitance electrodes W, each self-capacitance electrode 30 is electrically connected with one of four touch detection signal lines 31 one by one through the through-hole 32. In addition, since the common electrode layer is generally made of an indium tin oxide (Indium Tin Oxide, ITO) material, and the ITO material has a large resistance, in order to maximally reduce the resistance thereof and increase the signal to noise ratio of electric signals transmitted by the self-capacitance electrode, the self-capacitance electrode can be electrically connected with the corresponding touch detection signal line through a plurality of through-holes. That is, the self-capacitance electrode is in parallel connection to a plurality of metal resistances formed by the touch detection signal lines, which can maximally reduce the resistance of the self-capacitance electrode, so as to increase signal to noise ratio of the signals transmitted by the self-capacitance electrode, thereby improving touch experience of the user.

An embodiment of the present disclosure provides another touch display panel, referring to FIG. 1B, each self-capacitance electrode 30 includes a first area F1 and a second area F2, a touch detection signal line 31 is arranged between each two adjacent pixel columns L corresponding to the first area F1, but no touch detection signal line 31 is arranged between pixel columns L corresponding to the second area F2. Since the touch detection signal line is a non-transparent metal line, therefore, comparing with the related art, in the touch display panel provided by the present disclosure, a touch detection signal line is not arranged between the pixel columns corresponding to the second area, which improves open ratio of the touch display panel, thereby improving display effect and touch experience of the user.

Figure 3:
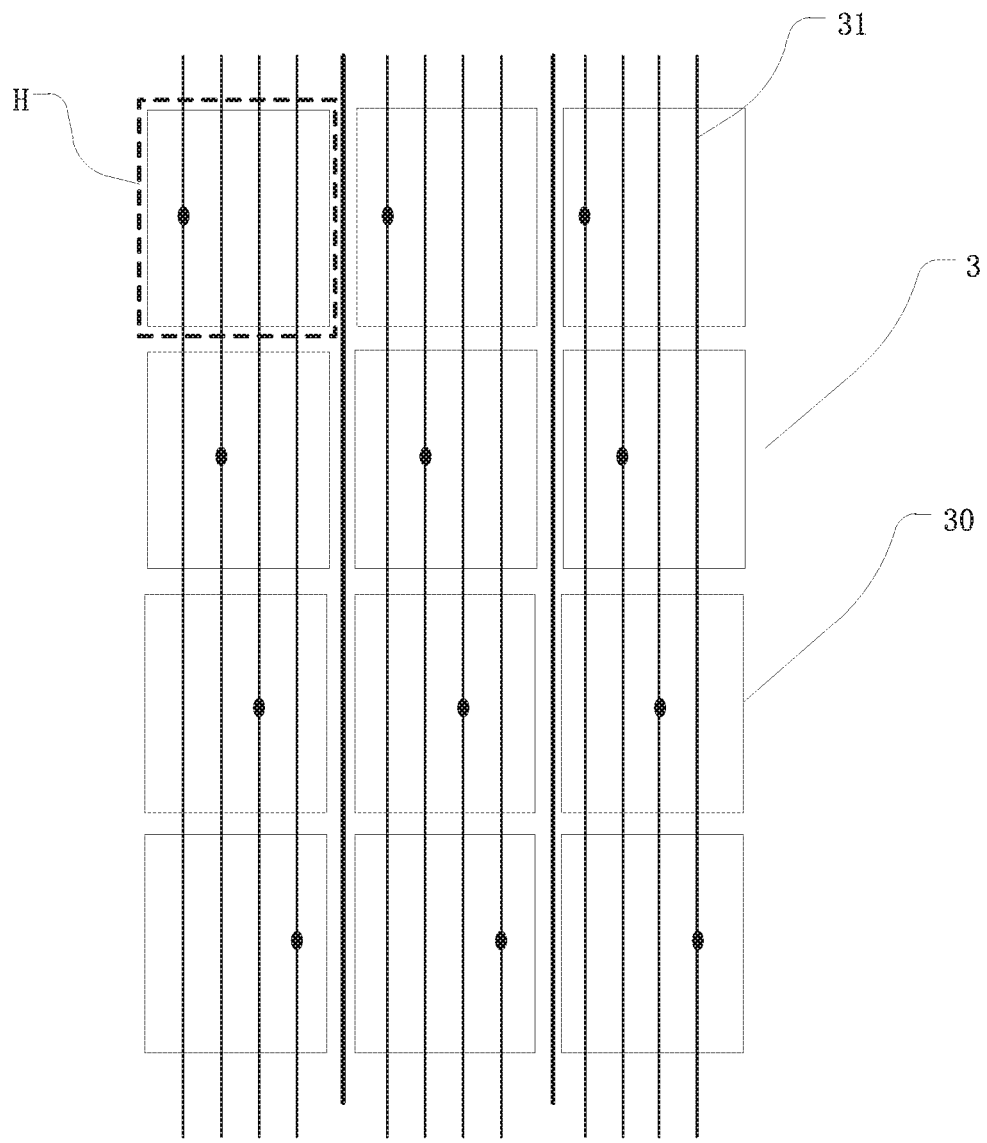
FIG. 3 illustrates a top view of a touch display panel according to still another embodiment of the present disclosure.
Figure 4:
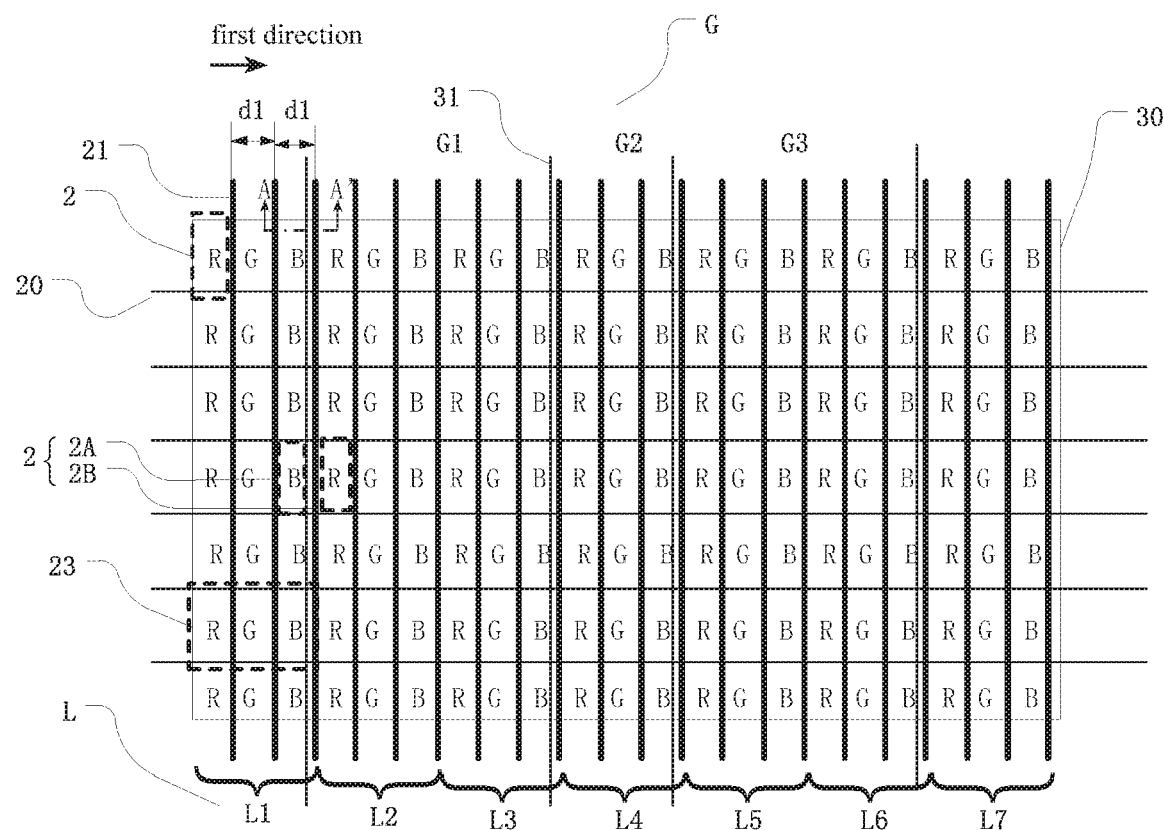
FIG. 4 illustrates an enlarged view of part H of the touch display panel shown in FIG. 3.

Referring to FIG. 3 and FIG. 4, FIG. 3 illustrates a top view of another touch display panel provided by the present disclosure, FIG. 4 illustrates an enlarged view of part H of the touch display panel shown in FIG. 3. In the touch display panel provided by the present embodiment, the difference of the number of the pixel columns at two sides of each touch detection signal lines 31 is no more than 1, i.e., 0 or 1. When the difference of the number of the pixel columns at two sides of each touch detection signal line 31 is 0, it means that the touch detection signal lines 31 are uniformly distributed in the self-capacitance electrode 30. An area between two adjacent touch detection signal lines 31 is a third area G, the difference of the number of the pixel columns in any two of the third areas G is no more than 1, as shown in FIG. 4, the third area G1, G2, G3 respectively includes 2 pixel columns, 1 pixel column, 2 pixel columns, the difference of the number of the pixel columns between any two of the third areas is no more than 1. In the touch display panel provided by the present disclosure, touch detection signal lines are uniformly distributed or approximately uniformly distributed corresponding to each self-capacitance electrode, so that both the open ratio and the display uniformity are improved, thereby improving display effect.

Figure 5:
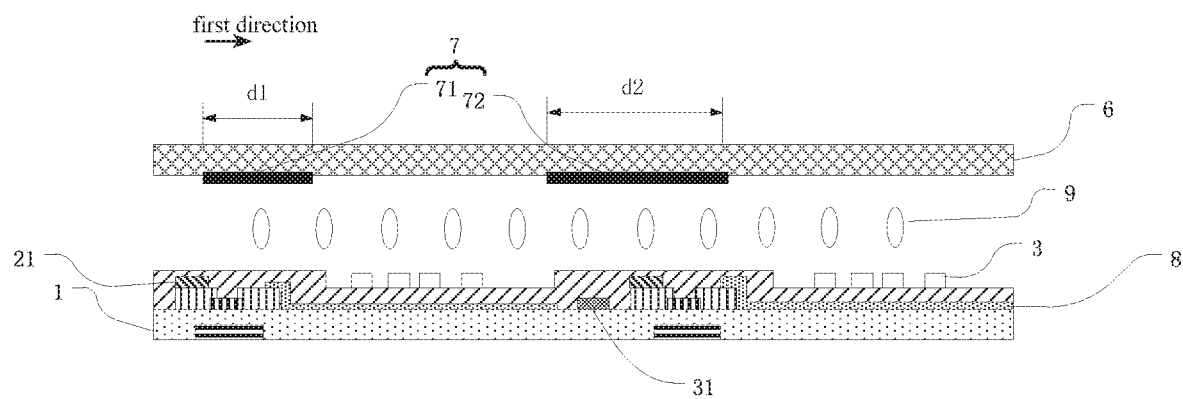
FIG. 5 illustrates a cross-sectional view of the touch display panel shown in FIG. 4 along AA' line.

Referring to FIG. 4 and FIG. 5, the FIG. 5 is cross-sectional view of a touch display panel shown in FIG. 4 along AA' line. In the touch display panel provided by the present embodiment, the touch detection signal line 31 and the data line 21 are arranged in a same layer. The arrangement that the touch detection signal line and the data line are in the same layer can reduce processing procedures and thus can reduce cost.

Referring to FIG. 4 and FIG. 5, the touch display panel provided by an embodiment of the present disclosure further includes a first substrate 6, the first substrate 6 and the base substrate 1 are arranged opposite to each other. The touch display panel further includes a black matrix layer 7, the black matrix layer 7 is arranged at a surface of a side of the first substrate 6 facing the base substrate 1. The black matrix layer 7 includes a first black matrix 71 and a second black matrix 72. In the extending direction of the scan line 20, i.e., the first direction, a width d1 of the first black matrix 71 is less than a width d2 of the second black matrix 72. As shown in FIG. 5, an orthogonal projection of the touch detection signal line 31 on the first substrate is located in an area where the second black matrix 72 is located, and an orthogonal projection of the data line 21 adjacent to the touch detection signal line 31 on the first substrate is also located in the area where the second black matrix 72 is located. Similarly, since the metal line and the touch detection signal line are in a same layer and are parallel to each other, and there is also a data line at a side of the metal line, which also needs to correspond to a black matrix with a large width, therefore, the black matrix corresponding to the metal line (not shown) is also a second black matrix. Through providing the black matrix layer, light-proof metal lines such as the metal line, touch detection signal line and the data line can be shielded, so as to avoid light leakage, thereby achieving better display effect.

Referring to FIG. 4, an embodiment of the present disclosure provides another touch display panel. In the touch display panel, the distances between any adjacent two data lines 21 are the same, all being d1, such an arrangement makes the processing relatively simple, so as to reduce cost. In the touch display panel provided by the present embodiment, a light transmitting area of the sub-pixel 2A provided with the touch detection signal line 31 is smaller than a light transmitting area of the sub-pixel 2B without the touch detection signal line 31. According to the related art, through adjusting the pixel voltage corresponding to the sub-pixel 2, a voltage difference between the common electrode and the pixel electrode corresponding to the sub-pixel 2A can be set as larger than a voltage difference between the common electrode and the pixel electrode corresponding to the sub-pixel 2B. Thus, through adjusting the liquid crystal reflecting light of the sub-pixels 2A, 2B, the light transmittance can be adjusted, so that the light transmittance of the sub-pixel 2A is larger than the light transmittance of the sub-pixel 2B, thereby improving the display uniformity of the entire touch display panel.

Figure 6:
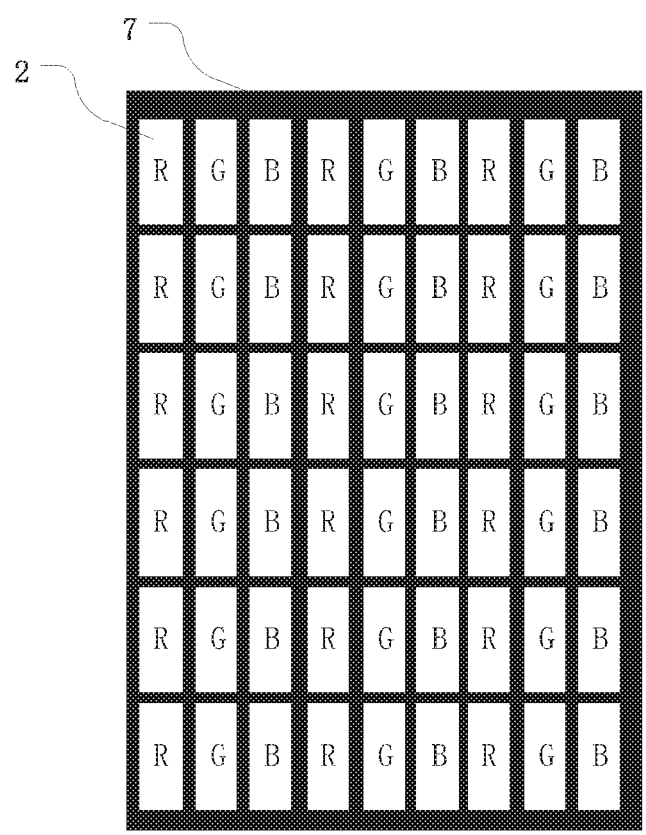
FIG. 6 illustrates a top view of a touch display panel according to still another embodiment of the present disclosure.
Figure 7:
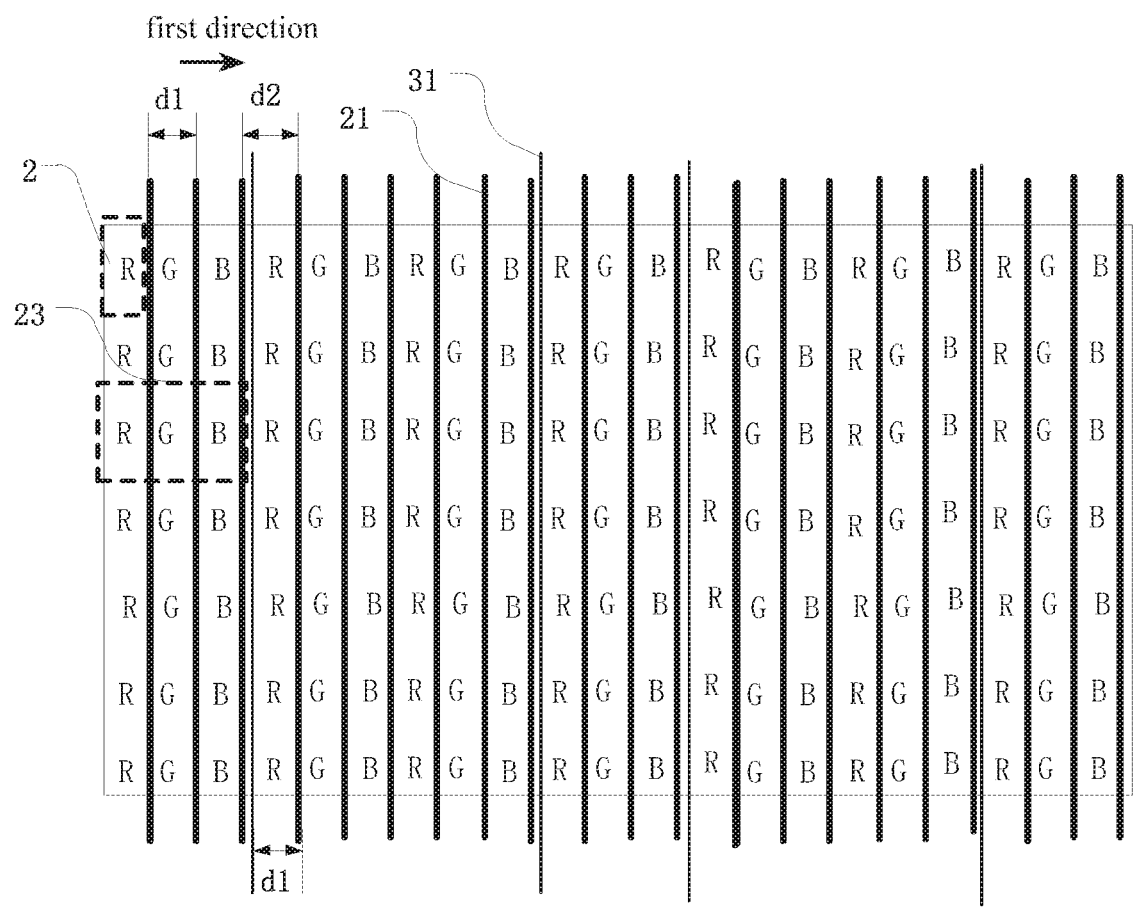
FIG. 7 illustrates a partial enlarged view of a touch display panel according to an embodiment of the present disclosure.

An embodiment of the present disclosure provides another touch display panel, referring to FIG. 6, the light transmitting area of each sub-pixel 2 is the same. In the present embodiment, it is possible to set the distance between adjacent data lines located at two sides of the touch detection signal line as larger than the distance between other adjacent data lines, so that the light transmitting area of each sub-pixel 2 is the same. Referring to FIG. 7, the distance between the two adjacent data lines 21 at two sides of the touch detection signal line 31 in the first direction is d1, the distance between two other adjacent data lines 21 in the first direction is d2, and d2 is larger than d1. Optionally, the distance between the touch detection signal line 31 and one of the adjacent data lines 21 can be d1. In the present embodiment, it is also possible to further or individually adjust the width of the first black matrix and the second black matrix, so that the light transmitting area of each sub-pixel can be the same. The touch display panel provided by the embodiments of the present disclosure has higher display uniformity, thereby improving user experience.

Referring to FIG. 4 and FIG. 7, optionally, in another touch display panel provided by the present disclosure, each touch detection signal line 31 is adjacent to the sub-pixel 2 with a same color. Further, each pixel column L includes a red sub-pixel R, a green sub-pixel G and a blue sub-pixel B, and the touch detection signal line 31 is adjacent to the blue sub-pixel B or the red sub-pixel R. The touch detection signal line 31 is not adjacent to the green sub-pixel G, so that a light transmitting area corresponding to the green sub-pixel G is larger than a light transmitting area, of the red sub-pixel R or a light transmitting area of the blue sub-pixel B. Through increasing the light transmitting area of the green sub-pixel G with respect to the red sub-pixel R and the blue sub-pixel B, the present disclosure achieves the improvement of the transmittance of the pixel unit 23, which is advantage to improve the brightness of the liquid crystal display screen, and facilitate application of the liquid crystal display screen in small-size high-resolution panel.

Referring to FIG. 5, the touch display panel provided by the present disclosure further includes a pixel electrode layer 8, the pixel electrode layer 8 is arranged at a side of the base substrate 1 facing the first substrate 6, and the pixel electrode layer 8 and the common electrode layer 3 are arranged in different layers. The liquid crystal layer 9 rotates under the effect of an electric field between the common electrode layer 3 and the pixel electrode layer 8, so as to achieve frame display.

Figure 8:
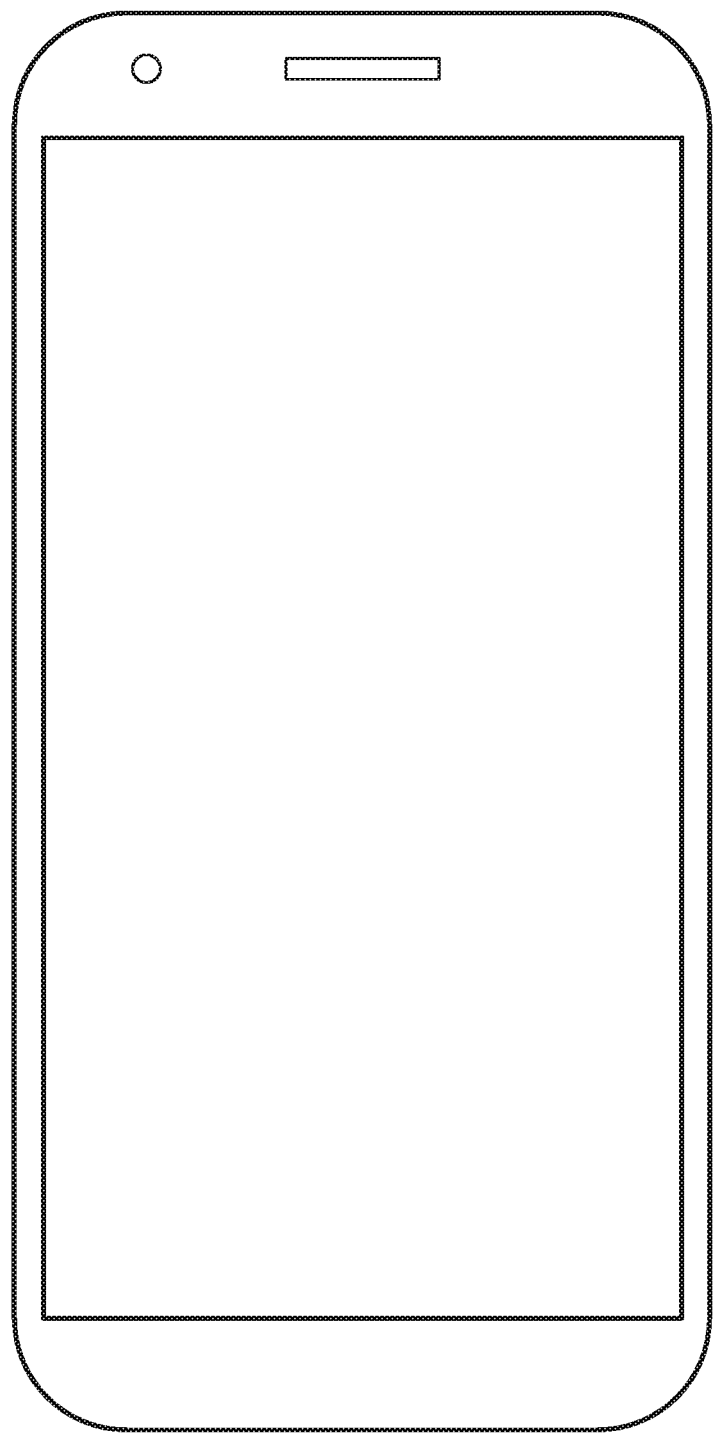
FIG. 8 illustrates a schematic diagram of a display device according to an embodiment of the present disclosure.

In addition, the present disclosure further provides a display device 100, which can include the touch display panel mentioned in the above embodiments. As shown in FIG. 8, FIG. 8 illustrates a schematic diagram of a display device provided by an embodiment of the present disclosure. The display device 100 can be a cellphone which has touch function as shown in FIG. 8, and the structure and function of the touch display panel in the display device 100 is the same as the embodiments mentioned above, which will not be repeated herein. Those skilled in the art should understand that, the above-mentioned display device can also be computer, television, wearable smart device and the like, which will not be listed herein.

It should be noted that, in the present disclosure, the expressions "central", "up", "down", "front", "rear", "left", "right", "vertical", "horizontal", "top", "bottom", "inner" and "outer" indicating directions or position relations shall be interpreted as based on the direction or position relation shown in the drawings, or merely for ease of description, rather than indicating or implying that the device or element shall have a specific direction, or configured and operated in a specific direction. Therefore, the above expressions shall not be understood as limiting the present disclosure.

The terms "first" and "second" are merely used for the purpose of description, rather than indicating or implying the number of technical features. Therefore, the feature defined by "first" and "second" can indicate or imply to include one or more of the features. In the present disclosure, "a plurality of" refers to two or more, unless otherwise noted. It should be noted that, in the present disclosure, the expressions "install", "connected with" and "connection" shall be interpreted as being generalized, for example, a fixed connection, a detachable connection or an integrated connection, which can be a direct connection, or an indirect connection by a medium, or an internal connection between two elements. For those skilled in the art, the specific meaning of the above terms shall be interpreted according to actual situations.

In the present disclosure, the specific features, structures, materials or characteristics can be combined in a suitable manner in one or more embodiments. The above are merely embodiments of the present disclosure, but the present disclosure is not limited thereto. Any variations or replacements obtained by those skilled in the art without creative effort shall fall into the protection scope of the present disclosure. Therefore, the protection scope of the present disclosure shall be defined by the appended claims.

What is claimed is:

1. A touch display panel, comprising:
a base substrate,
a plurality of gate lines provided on the base substrate,
a plurality of data lines provided on the base substrate,
a common electrode layer formed by a plurality of self-capacitance electrodes arranged in an M*N array;
a drive integrated circuit; and
a plurality of touch detection signal lines;
wherein the plurality of gate lines and the plurality of data lines are insulated from and intersecting with each other to define a plurality of sub-pixels, at least three adjacent sub-pixel columns of the plurality of sub-pixels constitute one pixel column, each sub-pixel column is parallel to an extending direction of the plurality of data lines;
each of the plurality of touch detection signal lines is located between two adjacent pixel columns, the plurality of touch detection signal lines connects the plurality of self-capacitance electrodes with the drive integrated circuit, at least a part of the two adjacent pixel columns is not provided with the touch detection signal line therebetween;
in a display stage, the drive integrated circuit provides a common signal to the plurality of touch detection signal lines;
in a touch stage, the drive integrated circuit provides a touch detection signal to the plurality of touch detection signal lines,
wherein the touch display panel further comprises:
a plurality of metal lines, the plurality of metal lines is arranged in a gap between two adjacent columns of the plurality of self-capacitance electrodes, the two adjacent columns of the plurality of self-capacitance electrodes are arranged along an extending direction of a scan line;
wherein the plurality of metal lines and the plurality of touch detection signal lines are arranged in a same layer and are parallel to each other;
in the display stage, the drive integrated circuit provides a common signal to the plurality of metal lines;
in the touch stage, the drive integrated circuit provides a touch detection signal to the plurality of metal lines.

2. The touch display panel according to claim 1, wherein in each column of self-capacitance electrodes, each self-capacitance electrode is corresponding to one of M touch detection signal lines one by one.

3. The touch display panel according to claim 2, wherein each of the plurality of self-capacitance electrodes comprises a first area and a second area; each two adjacent pixel columns corresponding to the first area are provided with a touch detection signal line therebetween; each two adjacent pixel columns corresponding to the second area are not provided with a touch detection signal line.

4. The touch display panel according to claim 3, wherein the plurality of touch detection signal lines and the plurality of data lines are arranged in a same layer.

5. The touch display panel according to claim 4, further comprising:
a first substrate, arranged opposite to the base substrate;
a black matrix layer, arranged at a surface of a side of the first substrate facing the base substrate;
wherein the black matrix layer comprises a first black matrix and a second black matrix, in the extending direction of the scan line, a width of the first black matrix is smaller than a width of the second black matrix;
both an orthographic projection of the plurality of touch detection signal lines on the first substrate and an orthographic projection of the plurality of metal lines on the first substrate are located in an area where the second black matrix is located.

6. The touch display panel according to claim 4, wherein the plurality of data lines are equally spaced from each other.

7. The touch display panel according to claim 4, wherein a light transmitting area of one of the plurality of sub-pixels is identical to a light transmitting area of any other one of the plurality of sub-pixels.

8. The touch display panel according to claim 7, wherein a distance between two adjacent data lines located at two sides of the touch detection signal line is larger than a distance between any other two adjacent data lines.

9. The touch display panel according to claim 4, wherein the touch detection signal line is adjacent to a sub-pixel of a same color.

10. The touch display panel according to claim 9, wherein each pixel column comprises a red sub-pixel, a green sub-pixel and a blue sub-pixel, and the touch detection signal line is adjacent to the red sub-pixel or the blue sub-pixel.

11. The touch display panel according to claim 2, wherein for the touch detection signal line corresponding to each of the self-capacitance electrode, a difference of number of the pixel columns at two sides of each touch detection signal line is no more than 1, an area between two adjacent touch detection signal lines is a third area, a difference of number of the pixel columns contained by any two of the third areas is no more than 1.

12. The touch display panel according to claim 1, further comprising:
   a pixel electrode layer, arranged at a side of the base substrate facing the first substrate;
   wherein the pixel electrode layer and the common electrode layer are arranged in different layers.

13. A display device, comprising a touch display panel, the touch display panel comprising:
   a base substrate,
   a plurality of gate lines provided on the base substrate,
   a plurality of data lines provided on the base substrate,
   a common electrode layer formed by a plurality of self-capacitance electrodes arranged in an M*N array;
   a drive integrated circuit; and
   a plurality of touch detection signal lines;
   wherein the plurality of gate lines and the plurality of data lines are insulated from and intersecting with each other to define a plurality of sub-pixels, at least three adjacent sub-pixel columns of the plurality of sub-pixels constitute one pixel column, each sub-pixel column is parallel to an extending direction of the plurality of data lines;
   each of the plurality of touch detection signal lines is located between two adjacent pixel columns, the plurality of touch detection signal lines connects the plurality of self-capacitance electrodes with the drive integrated circuit, at least a part of the two adjacent pixel columns is not provided with the touch detection signal line therebetween;
   in a display stage, the drive integrated circuit provides a common signal to the plurality of touch detection signal lines;
   in a touch stage, the drive integrated circuit provides a touch detection signal to the plurality of touch detection signal lines,
   wherein the touch display panel further comprises:
   a plurality of metal lines, the plurality of metal lines is arranged in a gap between two adjacent columns of the plurality of self-capacitance electrodes, the two adjacent columns of the plurality of self-capacitance electrodes are arranged along an extending direction of a scan line;
   wherein the plurality of metal lines and the plurality of touch detection signal lines are arranged in a same layer and are parallel to each other;
   in the display stage, the drive integrated circuit provides a common signal to the plurality of metal lines;
   in the touch stage, the drive integrated circuit provides a touch detection signal to the plurality of metal lines.

* * * * *